(12) United States Patent
Ryan et al.

(10) Patent No.: US 12,138,688 B1
(45) Date of Patent: Nov. 12, 2024

(54) BUILD PLATE ASSEMBLY FOR ADDITIVE MANUFACTURING INCLUDING A HEATING/COOLING SYSTEM

(71) Applicant: GM GLOBAL TECHNOLOGY OPERATIONS LLC, Detroit, MI (US)

(72) Inventors: Daniel Roy Ryan, Fenton, MI (US); Whitney Ann Poling, Rochester Hills, MI (US); Mark A. Kramarczyk, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/237,746

(22) Filed: Aug. 24, 2023

(51) Int. Cl.
*B22F 12/30* (2021.01)
*B22F 10/28* (2021.01)
*B22F 12/17* (2021.01)
*B33Y 10/00* (2015.01)
*B33Y 30/00* (2015.01)

(52) U.S. Cl.
CPC .............. *B22F 12/30* (2021.01); *B22F 10/28* (2021.01); *B22F 12/17* (2021.01); *B33Y 10/00* (2014.12); *B33Y 30/00* (2014.12)

(58) Field of Classification Search
CPC ..... B29C 64/295; B29C 64/245; B22F 12/33; B22F 12/17; B33Y 30/00
See application file for complete search history.

(56) References Cited

U.S. PATENT DOCUMENTS

| | | | |
|---|---|---|---|
| 10,145,271 B2 | 12/2018 | Brown et al. | |
| 10,151,269 B2 | 12/2018 | Brown et al. | |
| 10,294,552 B2 | 5/2019 | Liu et al. | |
| 10,435,773 B2 | 10/2019 | Liu et al. | |
| 10,487,741 B2 | 11/2019 | Brown et al. | |
| 10,487,868 B2 | 11/2019 | Brown et al. | |
| 10,514,036 B2 | 12/2019 | Brown et al. | |
| 10,982,306 B2 | 4/2021 | Bobel et al. | |
| 2017/0151631 A1* | 6/2017 | Kuo | B29C 64/295 |
| 2019/0291182 A1 | 9/2019 | Bobel et al. | |
| 2020/0123640 A1 | 4/2020 | Bobel et al. | |
| 2020/0306885 A1 | 10/2020 | Bobel et al. | |
| 2020/0307107 A1* | 10/2020 | Madinger | B22F 10/40 |

(Continued)

FOREIGN PATENT DOCUMENTS

| | | | | |
|---|---|---|---|---|
| DE | 10342880 A1 * | 4/2005 | | B22F 3/003 |
| DE | 102015211170 A1 * | 12/2016 | | B29C 64/153 |
| DE | 202016005655 U1 * | 12/2016 | | |

OTHER PUBLICATIONS

Translation of DE 103 42 880 A1 (Year: 2005).*
Translation of De 10 2015 211 170 A1 (Year: 2016).*
U.S. Appl. No. 18/237,692, filed Aug. 24, 2023, Ryan et al.

*Primary Examiner* — Jacob J Cigna

(57) ABSTRACT

A build plate assembly configured for use with an additive manufacturing machine. The build plate assembly includes a build plate defining a receptacle extending through the build plate. An insert is seated in the receptacle and movable within the receptacle. The insert includes a build surface configured to support a product built thereon by the additive manufacturing machine. The insert is seated on a base including a heating element configured to heat the insert. The insert is configured to expand within the receptacle when heated by the heating element. The receptacle is configured to accommodate the expansion.

20 Claims, 3 Drawing Sheets

(56) References Cited

U.S. PATENT DOCUMENTS

| | | |
|---|---|---|
| 2021/0206072 A1 | 7/2021 | Chae et al. |
| 2021/0308759 A1 | 10/2021 | Smith et al. |
| 2021/0402480 A1* | 12/2021 | Sweetland ............. B33Y 30/00 |
| 2022/0134425 A1 | 5/2022 | Anam et al. |

* cited by examiner

BUILD PLATE ASSEMBLY FOR ADDITIVE MANUFACTURING INCLUDING A HEATING/COOLING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a build plate assembly for an additive manufacturing machine.

Additive manufacturing, also referred to as 3D printing, is a manufacturing process that creates objects by adding material layer by layer onto a build plate. Unlike traditional subtractive manufacturing methods, which include cutting material out of a solid block to achieve a desired shape, additive manufacturing builds up an object on top of the build plate. The material of each layer is fused together to create a cohesive product. This process typically generates heat, which is transferred to the build plate.

SUMMARY

The present disclosure includes, in various features, a build plate assembly configured for use with an additive manufacturing machine. The build plate assembly includes a build plate defining a receptacle extending through the build plate. An insert is seated in the receptacle and movable within the receptacle. The insert includes a build surface configured to support a product built thereon by the additive manufacturing machine. The insert is seated on a base including a heating element configured to heat the insert. The insert is configured to expand within the receptacle when heated by the heating element. The receptacle is configured to accommodate the expansion.

In further features, the base includes a thermally conductive material.

In further features, the heating element includes at least one of heating rods and heating coils configured to conduct current.

In further features, the base includes a cooling element configured to cool the base and the insert.

In further features, the cooling element includes cooling lines configured to carry a chilled coolant through the base.

In further features, the cooling element includes at least one of cooling pins and Peltier coolers.

In further features, the base directly contacts the insert.

In further features, the present disclosure provides for an insulator defining an insulator receptacle, the base is seated in the insulator receptacle.

In further features, the insulator and the base define a gap therebetween.

In further features, a backing plate is on a side of the insulator opposite to the build plate, the backing plate defining a portion of the insulator receptacle.

In further features, a biasing member is in contact with the base to bias the base and the insert in an outward position.

In further features, the build plate includes an outer plate surface; and the insert includes an outer insert surface configured as the build surface. The outer insert surface protrudes beyond the outer plate surface prior to the expansion.

In further features, the receptacle is defined by an inner sidewall of the build plate. The inner sidewall tapers outward from an outer plate surface of the build plate such that the receptacle is smallest at the outer plate surface. The insert includes an angled side surface that is opposite to the inner sidewall. In response to the expansion, the angled side surface of the insert slides along the inner sidewall of the receptacle to draw the insert into the receptacle from an outward position to an inward position.

In further features, the build plate assembly is configured to be mounted to an elevator platform of the additive manufacturing machine.

The present disclosure further includes, in various features, a method for forming a product on a build plate with an additive manufacturing machine. The method includes the following: heating an insert of a build plate with a heating element included with a base supporting the insert, the build plate defining a receptacle housing the insert, the insert including a build surface configured to support the product built thereon by the additive manufacturing machine; depositing material on the insert; heating the material to fuse the material and form the product; and cooling the insert with a cooling element of the base.

In further features, the insert is configured to expand within the receptacle in response to being heated by heat transferred to the insert from the heating element, and the receptacle is configured to accommodate the expansion.

In further features, subsequent to the expansion the insert is configured to contract in response to being cooled by the cooling element of the base.

The present disclosure further includes, in various features, an additive manufacturing machine having an elevator platform and a build plate assembly configured to be mounted to the elevator platform. The build plate assembly includes: a build plate defining a receptacle extending through the build plate; an insert seated in the receptacle and movable within the receptacle, the insert including a build surface configured to support a product built thereon by the additive manufacturing machine; and a base on which the insert is seated, the base including a heating element configured to heat the insert and a cooling element configured to cool the insert. The insert is configured to expand to an expanded configuration within the receptacle in response to being heated by the heating element of the base, and the receptacle is configured to accommodate the expansion. The insert is configured to contract from the expanded configuration in response to being cooled by the cooling element of the base.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
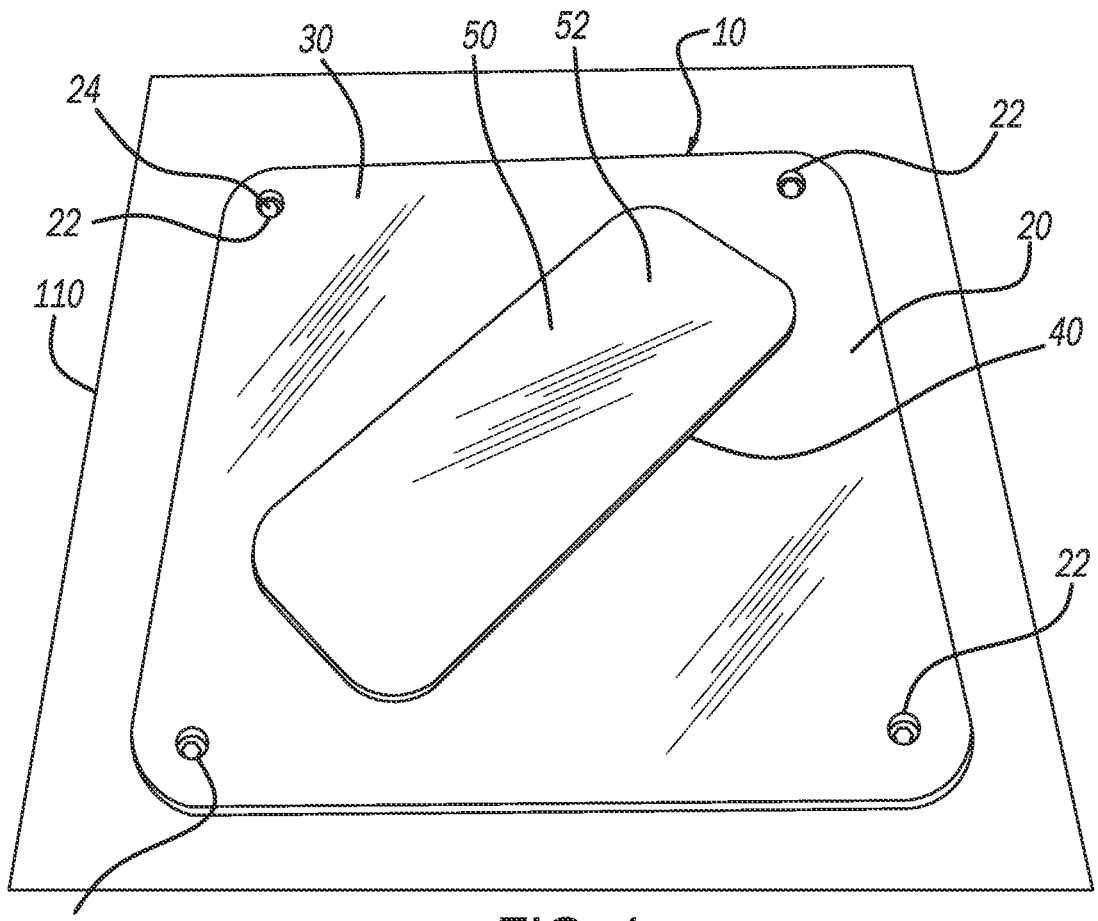
FIG. 1 is a perspective view of a build plate assembly in accordance with the present disclosure mounted to an additive manufacturing machine.

FIG. 1 illustrates a build plate assembly 10 in accordance with the present disclosure. The build plate assembly 10 is configured to be mounted to an additive manufacturing machine 110 configured to build any suitable product on the build plate assembly 10. The additive manufacturing machine 110 may be any suitable machine configured to build the product by depositing a plurality of material layers on the build plate assembly 10, such as by three-dimensional printing. The additive manufacturing machine 110 may be a metal additive manufacturing machine, for example. The additive manufacturing machine 110 may be configured to build any suitable vehicle-related products, such as, but not limited to, engine components, dashboard components, user interface components (e.g., buttons, knobs, switches, etc.), body components, door handles, interior door components, exhaust tips, etc. The additive manufacturing machine 110 may be configured to build products for use with any suitable vehicle, such as any suitable passenger vehicle, mass transit vehicle, aircraft, watercraft, commercial vehicle, construction vehicle, etc. The additive manufacturing machine 110 may be configured to build products for any suitable non-vehicular applications as well.

Figure 2:
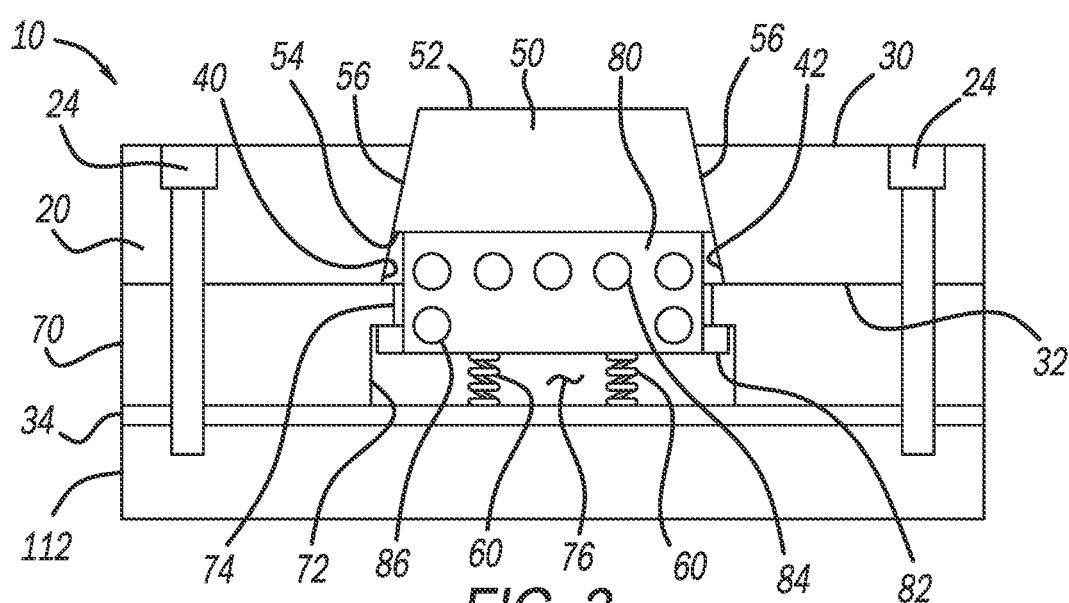
FIG. 2 is a cross-sectional view of the build plate assembly mounted to an elevator platform of the additive manufacturing machine.

With continued reference to FIG. 1, and additional reference to FIG. 2, the build plate assembly 10 includes a build plate 20 defining a plurality of openings 22 configured to receive any suitable fasteners 24. The fasteners 24 are configured to mount the build plate assembly 10 to an elevator platform 112 of the additive manufacturing machine 110. The build plate 20 includes an outer plate surface 30 and an inner plate surface 32, which is opposite to the outer plate surface 30. An insulator 70 is mounted to the inner plate surface 32 by way of the fasteners 24. A backing plate 34 is between insulator 70 and the elevator platform 112, and is secured in position by the fasteners 24.

The build plate 20 defines a receptacle 40 between the outer plate surface 30 and the inner plate surface 32. More specifically, an inner sidewall 42 of the build plate 20 extends from the outer plate surface 30 to the inner plate surface 32. The inner sidewall 42 defines the receptacle 40. The inner sidewall 42 angles outward from the outer plate surface 30 to the inner plate surface 32. The inner sidewall 42 may be angled from about 5° to about 40°, for example.

Seated within the receptacle 40 is an insert 50. The insert 50 is movable within the receptacle 40 to accommodate expansion and contraction of the insert 50 in response to heat generated during manufacturing. The insert 50 includes an outer insert surface 52 and an inner insert surface 54, which is opposite to the outer insert surface 52. The outer insert surface 52 is configured as a build surface on which the additive manufacturing machine 110 builds the product. An angled side surface 56 of the insert 50 extends from the outer insert surface 52 to the inner insert surface 54. The angled side surface 56 tapers outward from the outer insert surface 52 to the inner insert surface 54. The angled side surface 56 is angled to match an angle of the inner sidewall 42. The angled side surface 56 abuts the inner sidewall 42 to prevent powder from which the product is made from becoming trapped between the insert 50 and the build plate 20. The angled side surface 56 of the insert 50 slides along the inner sidewall 42 as the insert 50 expands and contracts during the additive manufacturing process, as explained herein.

The insert 50 may be formed in any suitable manner. For example, the insert 50 may be machined out from the build plate 20 by wire EDM, waterjet, or any other suitable process. The insert 50 may also be machined from any suitable stock material instead of being formed from the build plate 20. The receptacle 40 of the build plate 20 may be machined into the build plate 20 to provide the inner sidewall 42 with an angle matching the angled side surface 56 of the insert 50.

Prior to being seated in the receptacle 40 of the build plate 20, the insert 50 may be machined to include various features. For example, the insert 50 may be machined to include inlet/outlet ports for cooling or heating passageways, ejector pin holes, thermal sensing, a venting line, etc. Plugs may be inserted into the pre-machined openings in the insert 50 to prevent powder from falling into the machined openings during the build. After the completed part is removed from the build plate 20, the plugs may be removed and the internal features of the part are de-powdered, as needed. The plugs may be reusable and configured to fit into the openings, and held in position with a threaded pipe plug or press fit pin, for example.

The build plate 20 has a modulus and hardness that is the same as, or greater than, the modulus and hardness of the insert 50. To enhance wear resistance of the build plate 20, the inner sidewall 42 may be carburized or nitrided to locally increase hardness at the inner sidewall 42 where the insert 50 contacts the inner sidewall 42. Alternatively, the inner sidewall 42 may be coated with a material that is harder than the insert 50. The inner sidewall 42 and the angled side surface 56 may be machined smooth, such as by polishing to less than approximately Ra=4 µm, and a lubricant stable at elevated temperature, such as graphite, may be applied to the inner sidewall 42 and/or the angled side surface 56 to allow the insert 50 to move freely and smoothly.

The build plate 20 is seated on the insulator 70. The insulator 70 is any suitable insulator configured to insulate the build plate 20. The insulator 70 includes a sidewall 72 and an insulator flange 74. The sidewall 72 defines an insulator receptacle 76. Seated within the insulator receptacle 76 is a base 80 on which the insert 50 is seated. The base 80 is in direct contact with the insert 50. The base 80 includes a base flange 82, which is configured to abut the insulator flange 74. Gaps are defined between the base 80 and the insulator 70 to allow the base 80 to expand when heated.

The base 80 is made of any thermally conductive material, such as copper or aluminum alloy, for example. The base 80 includes any suitable heating elements and cooling elements. In some applications, the base 80 may include only the heating elements or only the cooling elements. In the example illustrated, extending through the base 80 are heating elements in the form of heating rods 84, which transfer heat to the base 80 when current is run through the heating rods 84. Heating coils may be included in place of, or in addition to, the heating rods 84. The base 80 as illustrated further includes cooling elements in the form of cooling lines 86 configured in any suitable manner to cool the base 80. For example, any suitable coolant may be run through the cooling lines 86 to cool the base 80. Suitable coolants include, but are not limited to, chilled inert gas (e.g., Ar gas), chilled fluid that is non-reactive with deposition powder (e.g., mineral oil/glycol), Peltier coolers, cooling pins, etc. The cooling lines 86 may include drill holes. The base 80 may be manufactured in suitable manner, such as by way of any suitable additive manufacturing process that defines channels for the heating rods 84 and the cooling lines 86. The insulator 70 and/or the elevator platform 112 may include any suitable passageways to accommodate cooling lines and electrical connections for the heating rods 84.

Figure 3:
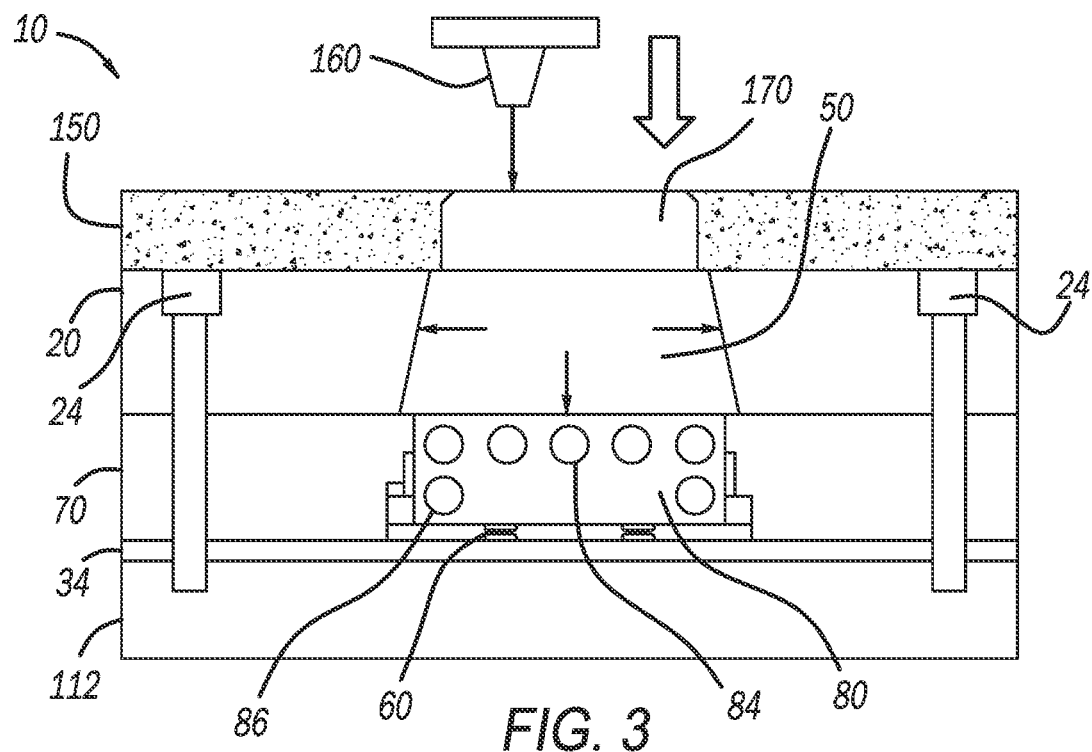
FIG. 3. is a cross-sectional view of the build plate assembly with a product being formed on an insert thereof by additive manufacturing.

FIG. 3 illustrates a first portion 170 of a product being formed on the insert 50 by the additive manufacturing machine 110. Prior to forming the product, the insert 50 may be heated by the heating elements of the base 80. For example, current may be run through the heating rods 84 to heat the base 80. Heat from the base 80 transfers to the insert 50, which is in contact with the base 80. Heating the insert 50 causes the insert 50 to expand outward and downward, such as in the direction of the arrows of FIG. 3. Prior to being heated, the outer insert surface 52 is flush with, or protrudes beyond, the outer plate surface 30. When heated, the insert 50 moves into the receptacle 40. Pre-heating the insert 50 minimizes temperature difference between the insert 50 and powder 150 fused thereon. Pre-heating also slows the cooling rate in the melt pool area at the outer insert surface 52, which reduces any risk of thermal distortion or cracking. Heating the insert 50 can reduce residual stress and warping influenced by the rapid increases and decreases in temperature created from the speed of the laser fusion process. Heating can also improve homogeneity of heat distribution leading to a more predictable result and higher build success.

The temperature of the base 80 may be continuous or variable during the build process. Thus, the heating profile can change during the build process. For example, the temperature of the heating may be increased, decreased, or the heating may be stopped altogether. For a tall build, the heating rods 84 may be activated during the first few centimeters of the build to minimize warping of the insert 50. The heating rods 84 may be deactivated as the build grows taller.

To form the first portion 170, the powder 150 is first deposited on the outer plate surface 30 of the build plate 20, and on the outer insert surface 52 of the insert 50. The build plate 20 may be made of any suitable material, such as any suitable alloy. The insert 50 may also be made of any suitable material, such as any suitable alloy that is the same as, or different from, the alloy of the build plate 20. The powder 150 is any suitable powder alloy configured to be welded to the outer insert surface 52 by the laser 160. The alloy of the insert 50 may be the same as, or different from, the alloy of the powder 150.

A laser 160 fuses the powder 150 arranged on the outer insert surface 52 to build the first portion 170 of the product. Numerous layers of the powder 150 are deposited, and heated by the laser 160 to build the product upward layer by layer. As the powder 150 is heated by the laser 160, heat may be transferred to the insert 50 depending on the temperature to which the insert 50 is pre-heated by the base 80. As the insert 50 is heated by the base 80 and/or by heat generated by laser fusion, the insert 50 expands outward and downward as illustrated by the arrows of FIG. 3, for example. As the insert 50 expands outward against the inner sidewall 42 of the receptacle 40, which is tapered, the insert 50 expands downward towards the backing plate 34 and into the receptacle 40 from the outward position of FIG. 1 or FIG. 2 to an inward position shown in FIG. 3. Specifically, as the insert 50 expands, the side surface 56 slides along the inner sidewall 42 of the receptacle 40, both of which are angled, to allow the insert 50 to expand into the receptacle 40 to the inward position.

Figure 4:
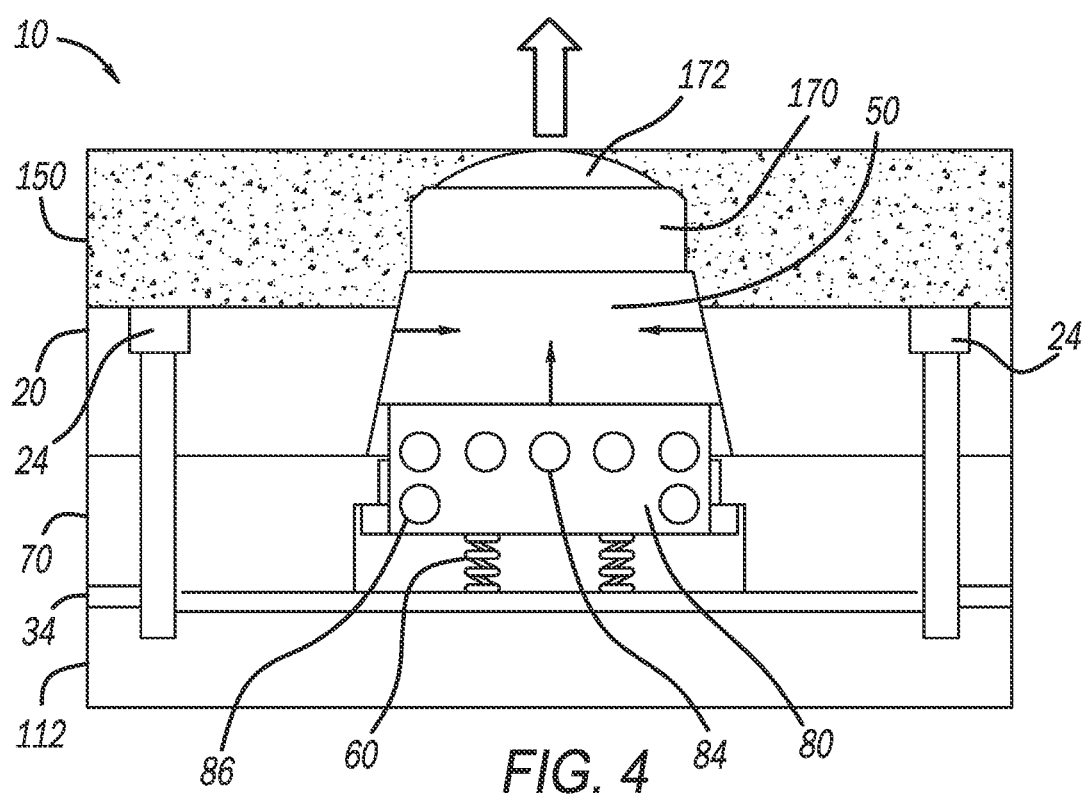
FIG. 4 is a cross-sectional view of the build plate assembly with the product formed therein.

FIG. 4 illustrates a second portion 172 of the part formed on the first portion 170. The second portion 172 is formed by fusing with the laser 160 the powder 150 deposited on top of the first portion 170. After the part is completely formed, and the first portion 170 and the second portion 172 cool, the insert 50 will also cool. Cooling of the insert 50 may be facilitated by the cooling lines 86, such as by running coolant through the cooling lines 86. As the insert 50 cools, the insert 50 contracts back to its original shape and size. As illustrated in FIG. 4, biasing members 60 (such as springs) move the base 80 and the insert 50 back to the outer position where the outer insert surface 52 is flush with the outer plate surface 30 or protrudes outward beyond the outer plate surface 30, as illustrated in the example of FIG. 4. The cooling lines 86 support heat extraction during long builds of large parts and/or allow cooling to be performed after the product is complete. The cooling lines 86 can improve throughput by several hours by rapid cooling of the product after it is built and provide some microstructure control during the build. For example, over aging of certain alloys may be controlled by cooling the insert 50.

After the part has been fully formed, the excess powder 150 is removed, and the build plate assembly 10 is detached from the additive manufacture machine 110. The insert 50 with the part formed thereon is removed out of the receptacle 40 from the side of the inner plate surface 32. In some applications, the insert 50 is part of the product. Thus, the insert 50 need not be separated from the first portion 170 of the product, or any other portion of the product. In other applications, the insert 50 may not be part of the product, and thus the insert 50 will be separated from the first portion 170 in any suitable manner.

Once the insert 50 is removed from cooperation with the build plate 20, the build plate 20 may be reused for forming an additional product on an additional insert placed within the receptacle 40. Thermal stresses due to repeated, rapid heating and cooling of the build layers are contained within the insert 50. Thus, the build plate 20 does not experience permanent distortion due to plastic deformation. Preventing permanent distortion of the build plate 20 also prolongs the life of other components of the build plate assembly 10 and the additive manufacturing machine 110. For example, the fasteners 24 may also be reused, and a powder recoating arm for applying the powder 150 is protected from any possible damage.

Figure 5:
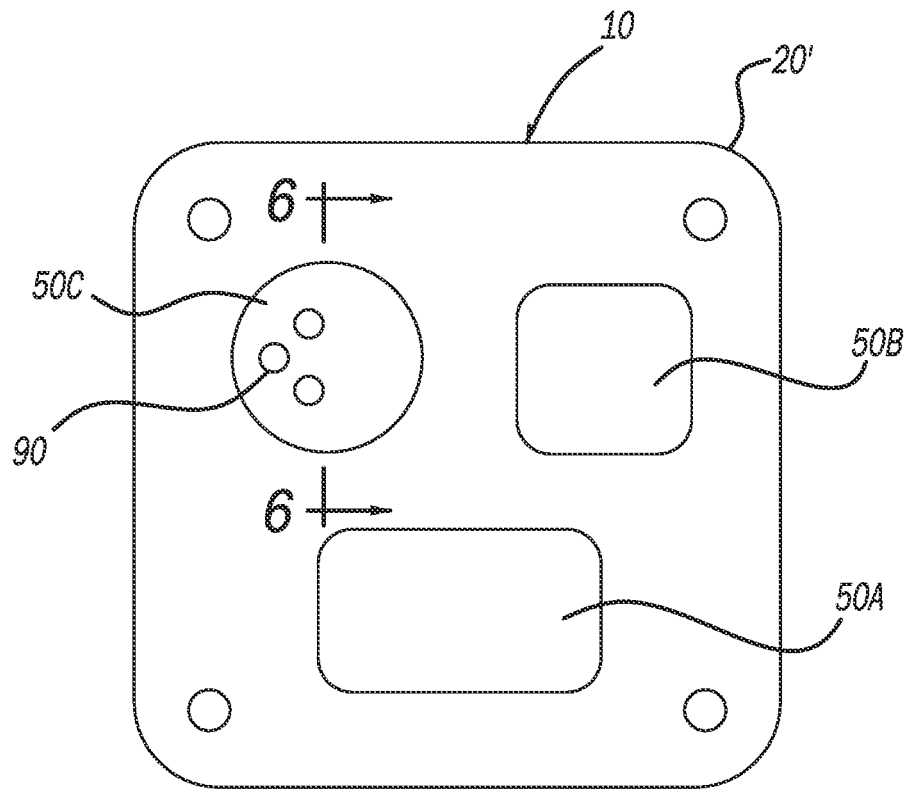
FIG. 5 is a plan view of another build plate assembly in accordance with the present disclosure, the build plate assembly including multiple inserts each with a build surface.

With reference to FIG. 5, another build plate 20' in accordance with the present disclosure is illustrated. The build plate 20' defines a plurality of receptacles, each one of which is configured to receive a different insert, such as a first insert 50A, a second insert 50B, and a third insert 50C. FIG. 5 illustrates the build plate 20' configured to accommodate three inserts, but the build plate 20' may be configured to accommodate any suitable number of inserts, such as two inserts or more than three inserts. The inserts may have any suitable size and shape. In the example of FIG. 5, the insert 50A is rectangular, the insert 50B is square, and the insert 50C is circular. Each one of the inserts 50A, 50B, and 50C includes a build surface configured to support a product formed thereon by the additive manufacturing machine 110.

Figure 6:
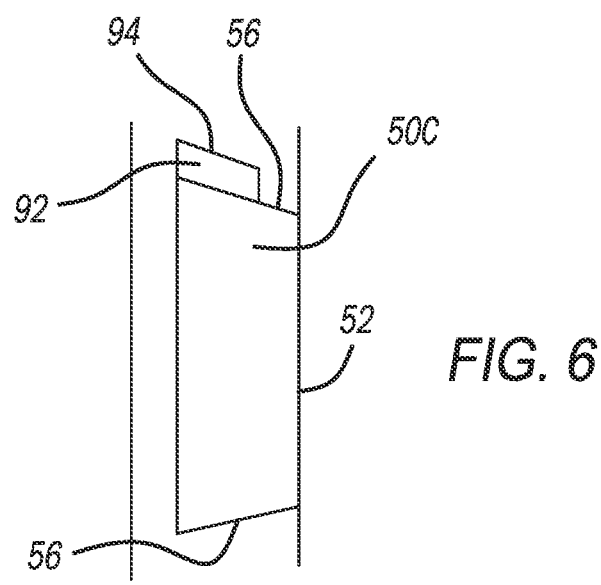
FIG. 6 is a cross-sectional view taken along line 6-6 of FIG. 5.

One or more of the inserts 50A, 50B, 50C may include any suitable features to be aligned with features of the product built on the inserts 50A, 50B, 50C. For example, the insert 50C includes a plurality of openings 90, which may be configured as cooling lines. The openings 90 will be aligned with corresponding cooling lines of a product built on the insert 50C. Thus, the insert 50C will be included as a portion of the product. To prevent powder 150 from falling into the openings 90 as the product is formed, plugs may be inserted into the openings 90. The openings 90 may be formed in the insert 50C in any suitable manner, such as by machining prior to attachment of the build plate 20' to the elevator platform 112. With reference to FIG. 6, the insert 50C may include a tab 92, which is configured to be received in a recess 94 of the build plate 20. Cooperation between the tab 92 and the recess 94 rotationally aligns the insert 50C and the openings 90 during the build process.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A build plate assembly configured for use with an additive manufacturing machine, the build plate assembly comprising:
   a build plate defining a receptacle extending through the build plate;
   an insert seated in the receptacle and movable within the receptacle, the insert including a build surface configured to support a product built thereon by the additive manufacturing machine; and
   a base on which the insert is seated, the base movable independent of the build plate and including a heating element configured to heat the insert;
   wherein the insert is configured to expand within the receptacle when heated by the heating element, and the receptacle is configured to accommodate the expansion.

2. The build plate assembly of claim 1, wherein the base includes a thermally conductive material.

3. The build plate assembly of claim 1, wherein the heating element includes at least one of heating rods and heating coils configured to conduct current.

4. The build plate assembly of claim 1, wherein the base directly contacts the insert.

5. The build plate assembly of claim 1, further comprising a biasing member in contact with the base to bias the base and the insert in an outward position.

6. The build plate assembly of claim 1, wherein:
   the build plate includes an outer plate surface; and
   the insert includes an outer insert surface configured as the build surface, the outer insert surface protrudes beyond the outer plate surface prior to the expansion.

7. The build plate assembly of claim 1, wherein:
   the receptacle is defined by an inner sidewall of the build plate, the inner sidewall tapers outward from an outer plate surface of the build plate such that the receptacle is smallest at the outer plate surface;
   the insert includes an angled side surface that is opposite to the inner sidewall; and
   in response to the expansion, the angled side surface of the insert slides along the inner sidewall of the receptacle to draw the insert into the receptacle from an outward position to an inward position.

8. The build plate assembly of claim 1, wherein the build plate assembly is configured to be mounted to an elevator platform of the additive manufacturing machine.

9. The build plate assembly of claim 1, wherein the base further includes a cooling element configured to cool the base and the insert.

10. The build plate assembly of claim 9, wherein the cooling element includes cooling lines configured to carry a chilled coolant through the base.

11. The build plate assembly of claim 9, wherein the cooling element includes at least one of cooling pins and Peltier coolers.

12. The build plate assembly of claim 1, further comprising an insulator defining an insulator receptacle, the base is seated in the insulator receptacle.

13. The build plate assembly of claim 12, wherein the insulator and the base define a gap therebetween.

14. The build plate assembly of claim 13, further comprising a backing plate on a side of the insulator opposite to the build plate, the backing plate defining a portion of the insulator receptacle.

15. A method for forming a product on a build plate with an additive manufacturing machine, the method comprising:
   heating an insert of a build plate with a heating element included with a base supporting the insert, the base movable independent of the build plate, the build plate defining a receptacle housing the insert, the insert including a build surface configured to support the product built thereon by the additive manufacturing machine;

depositing material on the insert;

heating the material to fuse the material and form the product; and cooling the insert with a cooling element of the base.

16. The method of claim 15, wherein the insert is configured to expand within the receptacle in response to being heated by heat transferred to the insert from the heating element, and the receptacle is configured to accommodate the expansion.

17. The method of claim 16, wherein subsequent to the expansion the insert is configured to contract in response to being cooled by the cooling element of the base.

18. An additive manufacturing machine comprising:

an elevator platform; and a build plate assembly configured to be mounted to the elevator platform, the build plate assembly including:
  a build plate defining a receptacle extending through the build plate;
  an insert seated in the receptacle and movable within the receptacle, the insert including a build surface configured to support a product built thereon by the additive manufacturing machine; and
  a base on which the insert is seated, the base movable independent of the build plate and including a heating element configured to heat the insert and a cooling element configured to cool the insert;

wherein:
  the insert is configured to expand to an expanded configuration within the receptacle in response to being heated by the heating element of the base, and the receptacle is configured to accommodate the expansion; and
  the insert is configured to contract from the expanded configuration in response to being cooled by the cooling element of the base.

19. The additive manufacturing machine of claim 18, wherein:
  the receptacle is defined by an inner sidewall of the build plate, the inner sidewall tapers outward from an outer plate surface of the build plate such that the receptacle is smallest at the outer plate surface;
  the insert includes an angled side surface that is opposite to the inner sidewall; and
  in response to the expansion, the angled side surface of the insert slides along the inner sidewall of the receptacle to draw the insert into the receptacle from an outward position to an inward position.

20. The additive manufacturing machine of claim 19, wherein the insert is seated directly on the base.

* * * * *